US012708968B2

(12) United States Patent
Yoshikawa

(10) Patent No.: US 12,708,968 B2
(45) Date of Patent: Aug. 18, 2026

(54) MACHINE TOOL AND MACHINE TOOL CONTROL METHOD

(71) Applicant: STAR MICRONICS CO., LTD., Shizuoka (JP)

(72) Inventor: Daijiro Yoshikawa, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 676 days.

(21) Appl. No.: 17/551,979

(22) Filed: Dec. 15, 2021

(65) Prior Publication Data

US 2022/0193840 A1 Jun. 23, 2022

(30) Foreign Application Priority Data

Dec. 18, 2020 (JP) ................................ 2020-209948

(51) Int. Cl.

| | |
|---|---|
| ***B23Q 7/08*** | (2006.01) |
| ***B23Q 7/00*** | (2006.01) |
| ***B23Q 15/22*** | (2006.01) |

(52) U.S. Cl.

CPC .............. *B23Q 7/008* (2013.01); *B23Q 7/08* (2013.01); *B23Q 15/22* (2013.01); *B23Q 2230/002* (2013.01); *B23Q 2707/003* (2013.01)

(58) Field of Classification Search

CPC ........... B23B 7/008; B23B 7/08; B23B 7/045; B23Q 2230/002; B23Q 2707/003; Y10T 82/2514

See application file for complete search history.

(56) References Cited

U.S. PATENT DOCUMENTS 5,072,635 A * 12/1991 White ...................... B23Q 7/12 82/124

6,539,828 B2 * 4/2003 Todoroski ............. B23Q 7/008 82/1.11

(Continued)

FOREIGN PATENT DOCUMENTS

CH 453851 A * 3/1968

CN 2435172 Y 6/2001

(Continued)

OTHER PUBLICATIONS

European Search Report mailed May 16, 2022 in EP Application No. 21214847.2, 10 pages.

(Continued)

*Primary Examiner* — Ryan Rufo

(74) *Attorney, Agent, or Firm* — MUNCY, GEISSLER, OLDS & LOWE, P.C.

(57) ABSTRACT

A machine tool capable of reducing entry of a workpiece chip into a product discharge chute. A controller controls a receipt of a product made of a workpiece held by a first spindle by a product receiver in a product receiving position, movement of the product receiver to a product dropping position and rotation of the product receiver to drop the product to the product discharge chute through an opening of the product discharge chute, and movement of the product receiver to the product receiving position to receive the product again. A second spindle is kept on standby in the product dropping position during which the opening of the product discharge chute is closed by the product receiver.

2 Claims, 8 Drawing Sheets

(56) References Cited

U.S. PATENT DOCUMENTS

| | | | | |
|---|---|---|---|---|
| 7,024,974 | B2 * | 4/2006 | Shimada | B23B 29/043 82/126 |
| 8,136,214 | B2 * | 3/2012 | Hessbruggen | B23Q 7/045 82/122 |
| 8,549,964 | B2 * | 10/2013 | Fujimoto | B23Q 39/048 82/124 |
| 8,663,077 | B2 * | 3/2014 | Katoh | B23Q 7/045 409/219 |
| 9,555,514 | B2 * | 1/2017 | Komine | B23Q 7/08 |
| 9,993,903 | B2 * | 6/2018 | Itoh | B23Q 11/08 |
| 2004/0060402 | A1 | 4/2004 | Shimada et al. | |
| 2014/0015182 | A1 | 1/2014 | Asahara et al. | |
| 2017/0312873 | A1 | 11/2017 | Itoh | |

FOREIGN PATENT DOCUMENTS

| | | | | |
|---|---|---|---|---|
| CN | 202763081 | U | 3/2013 | |
| CN | 104722781 | A * | 6/2015 | B23Q 7/00 |
| CN | 106098621 | A | 11/2016 | |
| DE | 1602713 | A1 * | 8/1971 | |
| EP | 1518639 | A2 * | 3/2005 | B23Q 7/008 |
| EP | 2570233 | A2 | 3/2013 | |
| JP | 59169702 | A * | 9/1984 | |
| JP | H02243205 | A | 9/1990 | |
| JP | H-0541605 | U | 6/1993 | |
| JP | H0634883 | Y2 | 9/1994 | |
| JP | H11226804 | A | 8/1999 | |
| JP | 2004114226 | A | 4/2004 | |
| JP | 2014024144 | A | 2/2014 | |
| JP | 2015036171 | A | 2/2015 | |
| JP | 2020151771 | A | 9/2020 | |
| KR | 890003727 | Y1 * | 6/1989 | |
| KR | 20180112936 | A * | 10/2018 | |
| KR | 20190036287 | A * | 4/2019 | |
| KR | 20190112996 | A * | 10/2019 | B23Q 7/14 |
| WO | WO2012132648 | A1 | 10/2012 | |

OTHER PUBLICATIONS

An Office Action in corresponding CN Application No. 202111172567.3 dated Dec. 16, 2025.

Office Action for CN Application No. 202111 172567.3 dated Jul. 28, 2025 and its English translation is attached (16 pages).

* cited by examiner

MACHINE TOOL AND MACHINE TOOL CONTROL METHOD

CROSS-REFERENCE TO RELATED APPLICATION

This application claims priority of Japanese Patent Application No. 2020-209948 filed on Dec. 18, 2020. The contents of this application are incorporated herein by reference in their entirety.

BACKGROUND OF THE INVENTION

The invention relates to a machine tool and a machine tool control method which discharges a product by use of a product receiver held by one of a plurality of spindles.

It is known that the machine tool includes a lathe having a main spindle and an opposite sub spindle in a machining chamber. The main spindle and the sub spindle each are capable of holding a workpiece and rotatable therewith. A product made of the workpiece may include a product too short to be held by the sub spindle. It is known that the sub spindle having a product receiver discharges a product from a main spindle position to outside the machining chamber.

In a machine tool having at least two spindles as disclosed in Japanese examined utility model application publication No. H06-34883, at least one of the spindles are relatively movable in a spindle axis direction of the spindle to deliver a product that has been primarily machined by one of the spindles to the other for a secondary machining to be done on the back side of the product. The product container held by one of the spindles is tumbled under orientation control of the spindle to discharge the product outside the machining area.

SUMMARY

A product discharge chute for receiving a product dropped from the product receiver held by the sub spindle is conventionally provided in the machining chamber. A workpiece chip often enters the chute in the chamber, which requires a time-consuming chip removing work. Such problem resides in a variety of machine tools including a machining center.

The present invention discloses a machine tool and a machine tool control method capable of reducing entry of a workpiece chip into the product discharge chute.

A machine tool of the invention includes a rotatable first spindle capable of holding a workpiece; a tool post capable of retaining a tool for use to machine the workpiece; a rotatable and movable second spindle capable of holding a product receiver that receives a product made of the workpiece; a product discharge chute provided with an opening, the chute discharging the product that has been dropped through the opening; and a controller capable of controlling movement and rotation of the second spindle. The controller controls a receipt of the product made of the workpiece held by the first spindle by the product receiver in a product receiving position, movement of the product receiver to a product dropping position and rotation of the product receiver to drop the product to the product discharge chute through the opening, and movement of the product receiver to the product receiving position to receive the product again. The second spindle is kept on standby in the product dropping position during which the opening of the product discharge chute is closed by the product receiver.

A machine tool control method of a machine tool including a rotatable first spindle capable of holding a workpiece, a tool post capable of retaining a tool for use to machine the workpiece, a rotatable and movable second spindle capable of holding a product receiver that receives a product made of the workpiece, and a product discharge chute provided with an opening, the chute discharging the product that has been dropped through the opening. The control method includes controlling movement and rotation of the second spindle that includes receiving the product made of the workpiece held by the first spindle by the product receiver in a product receiving position; moving the product receiver to a product dropping position and rotating the product receiver to drop the product to the product discharge chute through the opening; then keeping the second spindle on standby in the product dropping position during which closing the opening of the product discharge chute by the product receiver; and then moving the product receiver to the product receiving position to receive the product again.

The invention provides a machine tool and a machine tool control method capable of reducing entry of a workpiece chip into a product discharge chute.

DETAILED DESCRIPTION

Hereinafter, an embodiment of the present invention will be described. The invention is not limited to the exemplary embodiment and the features disclosed herein are necessarily not essential to the invention.

(1) Summary of Technology Included in the Present Invention

Technology included in the invention will be described with reference to FIG. 1 to FIG. 9. The drawings only schematically show an example of the invention. They may have a mismatch to each other due to different magnification in each direction. Each element denoted by a symbol is only an example.

Embodiment 1

Figure 1:
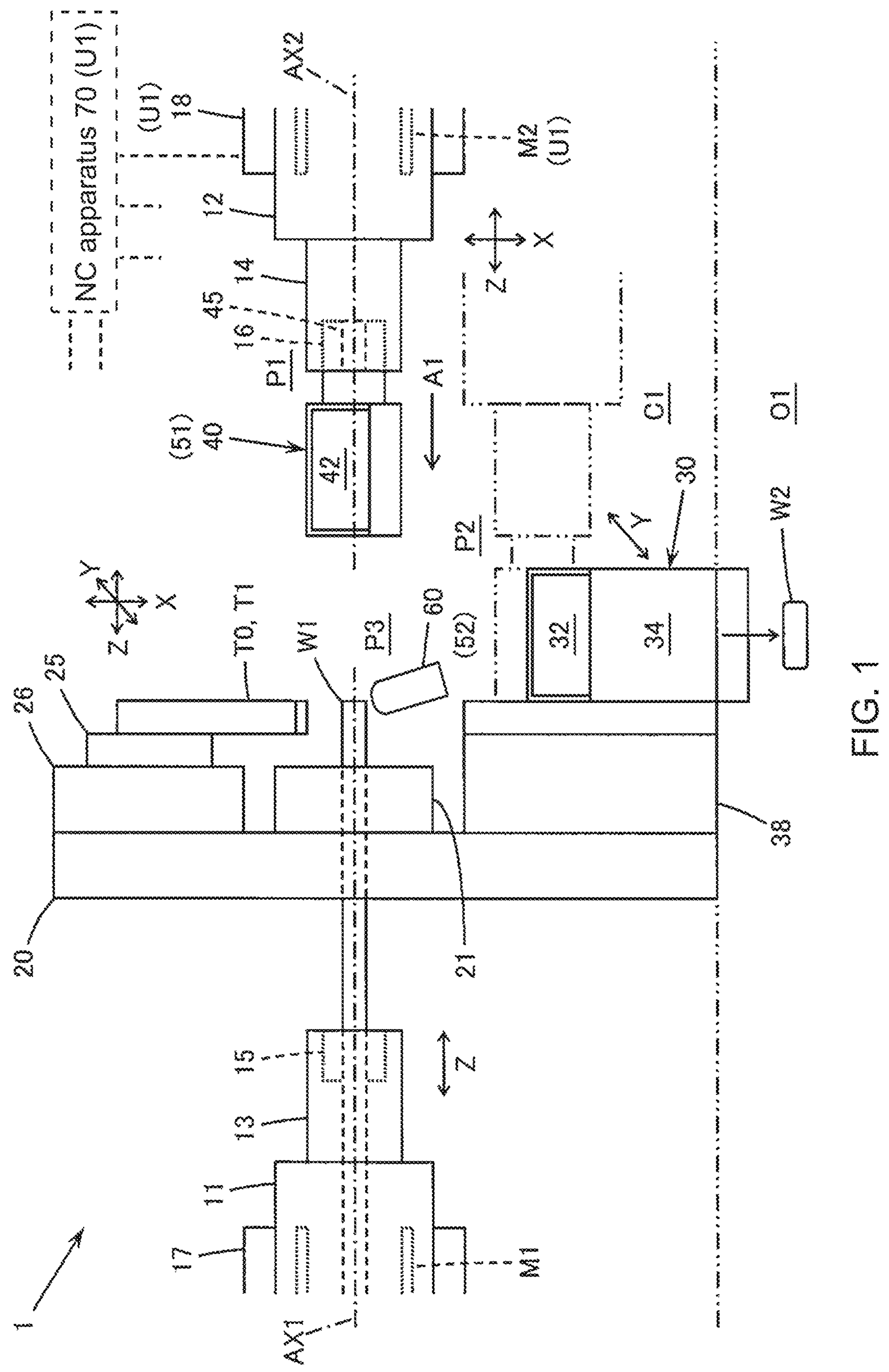
FIG. 1 is a plan view schematically showing a configuration of a machine tool.

As shown in FIG. 1, a machine tool 1 of an embodiment of the invention may include a first spindle 13, a tool post 25, a second spindle 14, a product discharge chute 30, and a controller U1. The first spindle 13 may hold a workpiece W1. The first spindle 13 may be rotatable. The tool post 25 may retain a tool TO for use to machine the workpiece W1. The second spindle 14 may hold a product receiver 40 that receives a product W2 made of the workpiece W1. The second spindle 14 may be rotatable and movable. The product discharge chute 30 may be provided with an opening 32. The chute 30 may discharge the product W2 that has been dropped through the chute opening 32. The controller U1 may control movement and rotation of the second spindle 14. The controller U1 may control a receipt of the product W2 made of the workpiece W1 held by the first spindle 13 by the product receiver 40 in a product receiving position P3. The controller U1 may control movement of the receiver 40 to a product dropping position P2 and rotation of the receiver 40 to drop the product W2 into the chute 30 through the chute opening 32. The controller U1 may control movement of the receiver 40 to the product receiving position P3 to receive the product W2 again. The second spindle 14 may be kept on standby in the product dropping position P2 during which the chute opening 32 is closed by the product receiver 40.

As described above, the product receiver 40 may be rotated to drop the product W2 into the product discharge chute 30 through the chute opening 32. Then, the receiver 40 may be kept on standby during which the chute opening 32 is closed by the receiver 40. Then, the receiver may return to the product receiving position P3 to receive the product W2 again. The product receiver 40 closing the chute opening 32 prevents entry of a workpiece chip into the chute 30. The embodiment provides a machine tool capable of reducing entry of a workpiece chip into the product discharge chute and thereby facilitating a chip removing work removing the workpiece chip from the product.

The machine tool may include a lathe and a machining center. The second spindle may be opposite the first spindle with respect to the spindle axis of the first spindle. The second spindle may not be opposite the first spindle. The product received by the product receiver may be part of the workpiece separated with a tool from the workpiece held by the first spindle. The product may be a workpiece that has been machined and released from the first spindle. The above remarks may apply to the following embodiments.

Embodiment 2

Figure 2:
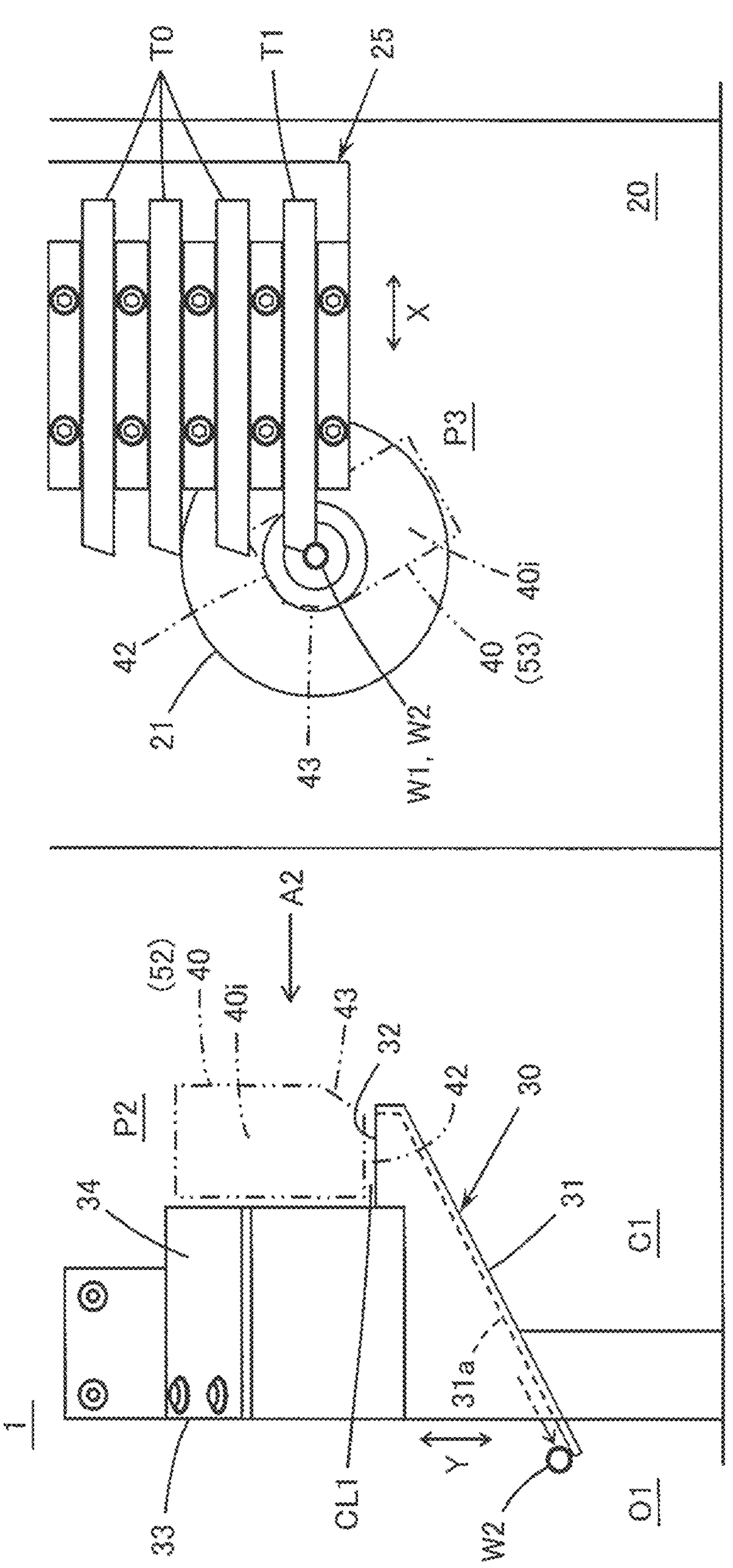
FIG. 2 schematically shows the machine tool as seen from an A1 direction of FIG. 1.
Figure 3:
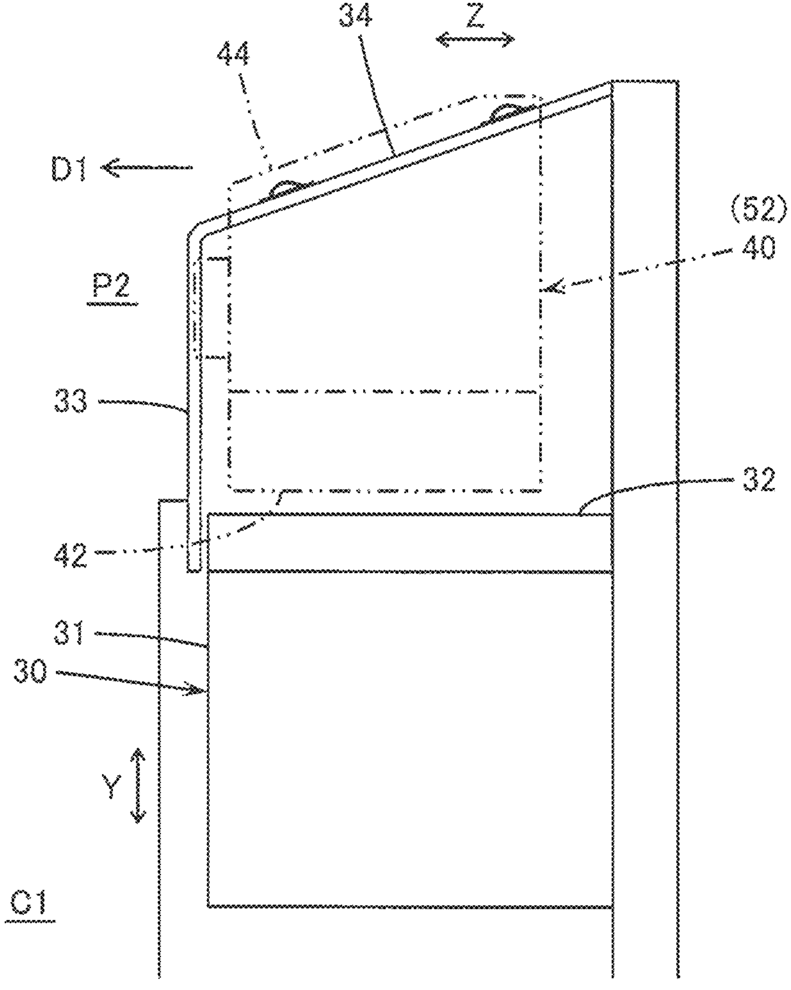
FIG. 3 schematically shows positional relationship of a product discharge chute and a product receiver as seen from an A2 direction of FIG. 2.
Figure 7:
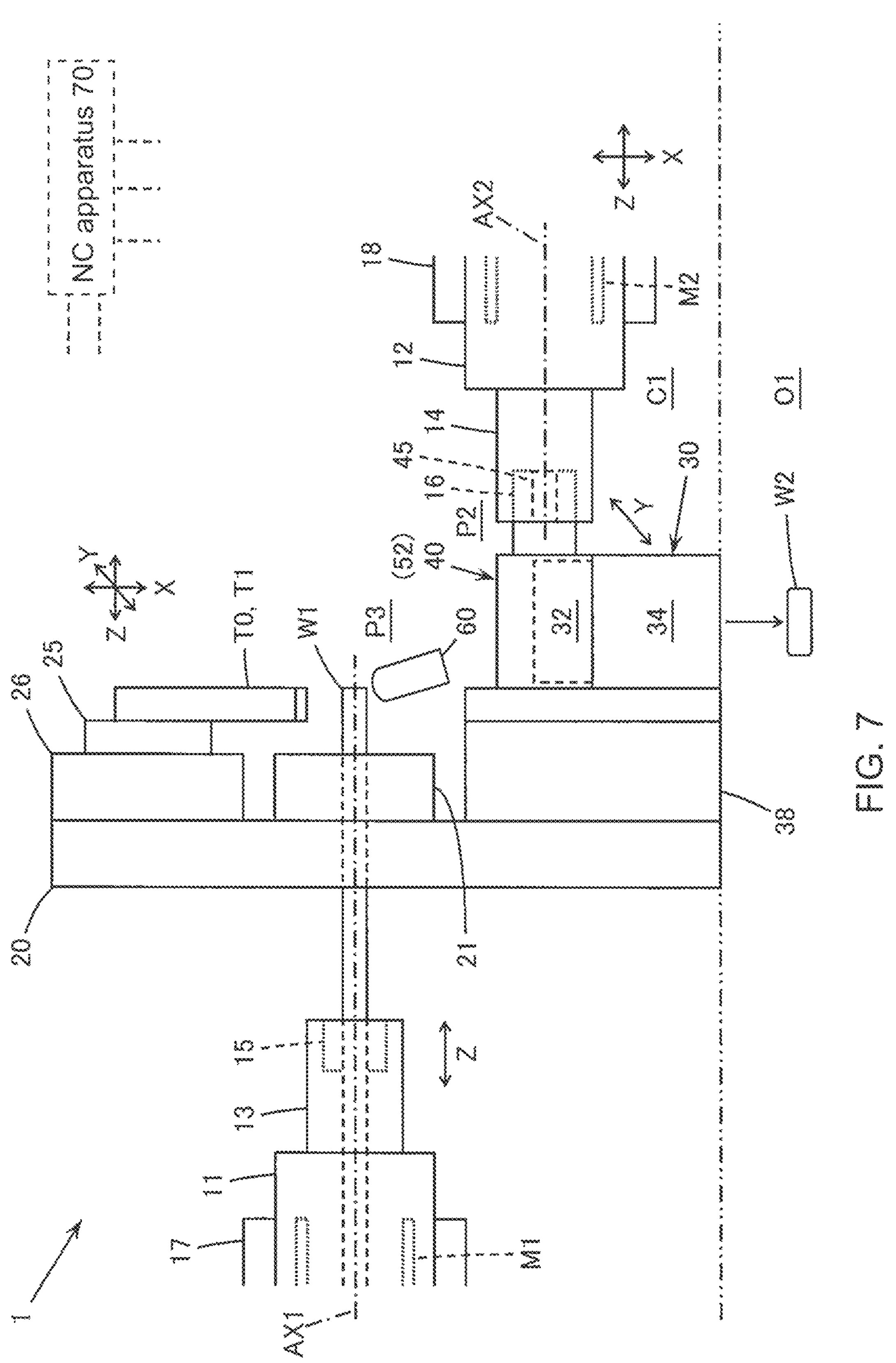
FIG. 7 is a plan view schematically showing the machine tool whose product receiver in a product dropping posture is located in a product dropping position.

As shown in FIGS. 2, 3, and 7, the rotation of the product receiver 40 may bring the receiver 40 into the product dropping posture 52 capable of dropping the product W2 into the product discharge chute 30 through the chute opening 32. Further, the second spindle 14 may be kept on standby during which the chute opening 32 is closed by the product receiver 40 kept in the product dropping posture 52. The embodiment requires no rotation of the receiver 40 for the purpose to close the chute opening 32 and therefore improves efficiency of the manufacturing cycle from the workpiece machining to the product discharge.

Embodiment 3

The machine tool control method of the embodiment may include controlling movement and rotation of the second spindle 14 that includes receiving the product W2 made of the workpiece W1 held by the first spindle 13 in the product receiving position P3 by the product receiver 40, moving the product receiver 40 to the product dropping position P2 and rotating the receiver 40 to drop the product W2 to the product discharge chute 30 through the chute opening 32, then keeping the second spindle 14 on standby in the product dropping position P3 during which closing the chute opening 32 by the product receiver 40, and then moving the product receiver 40 to the product receiving position P3 to receive the product W2 again.

As described above, the product receiver 40 may be rotated to drop the product W2 into the product discharge chute 30 through the chute opening 32. Then, the receiver 40 may be kept on standby during which the chute opening 32 is closed by the receiver 40. Then, the receiver may return to the product receiving position P3 to receive the product W2 again. The product receiver 40 closing the chute opening 32 prevents entry of a workpiece chip into the chute 30. The embodiment provides a machine tool capable of reducing entry of a workpiece chip into the product discharge chute and thereby facilitating the chip removing work.

Embodiment 4

As shown in FIGS. 2, 3, and 7, the control method may include rotating the product receiver 40 to bring the receiver 40 into a product dropping posture 52 to drop the product W2 to the product discharge chute 30 through the opening 32, and then keeping the second spindle 14 on standby during which closing the opening 32 by the product receiver 40 kept in the product dropping posture 52. The embodiment requires no further rotation of the receiver 40 for the purpose to close the chute opening 32 and therefore improves efficiency of the manufacturing cycle from the workpiece machining to the product discharge.

(2) Configuration of the Machine Tool

FIG. 1 is a plan view schematically showing a configuration of a machine tool 1. FIG. 2 schematically shows the machine tool 1 as seen from an A1 direction of FIG. 1. The machine tool 1 may be an NC (numerically controlled) lathe having an NC apparatus 70 performing a numerically controlled machining on a workpiece W1. FIG. 1 shows the NC apparatus 70 but the arrangement is not limited thereto. A control axis of the machine tool 1 as shown in FIGS. 1 and 2 may include an X-axis represented by “X”, a Y-axis represented by “Y”, and a Z-axis represented by “Z”. A Z-axis direction may be a horizontal direction along a spindle axis AX1 around which the workpiece W1 rotates and a spindle axis AX2 around which the product receiver 40 rotate. An X-axis direction may be a horizontal direction perpendicular to the Z-axis. A Y-axis direction may be a vertical direction perpendicular to the Z-axis. The Z-axis and the X-axis need to cross each other but need not be perpendicular. The Z-axis and the Y-axis need to cross each other but need not be perpendicular. The X-axis and the Y-axis need to cross each other but need not be perpendicular. The illustration is only a simplified example for explanation of the invention. The invention is not limited thereto. A positional relation between elements is only an example for explanation. The left and right direction may be replaced by the up and down direction or the front and back direction. The up and down direction may be replaced by the left and right direction or the front and back direction. The front and back direction may be replaced by the left and right direction or the up and down direction. The rotational direction may be inversed. If something is the same as something in direction or position, they may be the same or almost the same within an error range.

The machine tool 1 as shown in FIG. 1 and FIG. 2 may be a numerically controlled machine tool having headstocks 11 and 12, headstock drivers 17 and 18, a coolant discharger 60, a supporting bed 20, a guide bush 21, the tool post 25, a tool post driver 26, the product discharge chute 30, a chute driver 38, and an NC apparatus 70.

The headstocks 11 and 12 may be opposite each other with respect to the Z-axis direction. The first spindle 13 called a main spindle or a front spindle may be mounted on the headstock 11. The second spindle 14 called a sub spindle, a back spindle, or an opposite spindle may be mounted on the headstock 12. The machine tool 1 as shown in FIG. 1 may be a lathe of spindle moving type. The headstock 11 may move in the Z-axis direction by the headstock driver 17 under control of the NC apparatus 70. The headstock 12 may move in the Z-axis direction and the X-axis direction by the headstock driver 18 under control of the NC apparatus 70. The machine tool 1 may be a lathe of spindle stationary type. The headstock 12 may not move in the Z-axis direction while the headstock 11 may move in the Z-axis direction The first spindle 13 may be provided with a chuck 15 arranged at the front end of the first spindle 13. The chuck 15 may be a collet for releasably holding the workpiece W1. The workpiece W1 may be a cylindrical (bar) longitudinal material. The workpiece W1 may be inserted from the rear end of the first spindle 13 to be supplied to the chuck 15. As shown in FIG. 1, the guide bush 21 may be provided in front of the first spindle 13 to support the workpiece W1 slidably in the Z-axis direction. The inventive technology may be also applied to the machine tool 1 without the guide bush 21. The first spindle 13 holding the workpiece W1 may be rotatable about the spindle axis AX1. The workpiece W1 whose front side has been machined may be passed to the second spindle 14. The back side of the workpiece W1 may be then machined. The second spindle 14 may be provided with a chuck 16 arranged at the front end of the second spindle 14. The chuck 16 may be a collet for releasably holding the workpiece W1 or the product receiver 40. The second spindle 14 holding the workpiece W1 may be rotatable about the spindle axis AX2 and movable. The workpiece W1 whose front side has been machined and whose back side has been machined may be called a product. The second spindle 14 holding the product receiver 40 may be rotatable about the spindle axis AX2. The second spindle 14 may be movable.

The headstock 11 may be provided with a motor M1 for rotating the first spindle 13 on the spindle axis AX1 in response to a command from the NC apparatus 70. The headstock 12 may be provided with a motor M2 for rotating the second spindle 14 on the spindle axis AX2 in response to a command from the NC apparatus 70. The motors M1 and M2 may be a servo motor such as a built-in motor.

The coolant discharger 60 may pour coolant to the workpiece W1 protruded from the guide bush 21. The coolant may be a known oil. The accumulated coolant on the bottom of a machining chamber C1 may be recycled.

The supporting bed 20 may support the guide bush 21. The supporting bed 20 may further support the tool post 25 through the tool post driver 26 and the product discharge chute 30 through the chute driver 30. The tool post 25 may retain a plurality of tools TO attached for use to machine the workpiece W1. The tool post driver 26 may move the tool post 25 in the X-axis the Y-axis, and the Z-axis directions in response to a command from the NC apparatus 70. The moving directions of the tool post 25 and the headstocks 11 and 12 may not be limited to those as disclosed in FIG. 1. The tool post 25 as shown in FIG. 2 may be a gang tool post. The tool post 25 may be a turret and any other tool post. The plurality of tools T1 as shown in FIG. 2 may be a turning tool including a cut-off tool. The tool T1 may include a rotary tool such as a drill, an endmill, and a polygon cutter. One or more tools may be a tool provided in a tool unit detachably mounted on the tool post. The tool post 25 may be capable of machining the workpiece W1 supported by the guide bush 21 by using any of the tools TO. The workpiece W1 whose front side has been machined may be held by the second spindle 14. The workpiece W1 held by the first spindle 13 and the second spindle 14 may be separated with the cut-off tool T1. The tool post 25 and a not-shown tool post may perform back-machining on the back side of the workpiece W1 whose front side has been machined.

The product W2 made of the workpiece W1 may include a product too short to be held by the second spindle 14. The machine tool 1 may be provided with the product discharge chute 30 and the product receiver 40 held by the second spindle 14. The product discharge chute 30 may discharge the product W2 from the machining chamber C1 to an outside O1 of the machining chamber C1. The NC apparatus 70 may control movement and rotation of the second spindle 14 to cause the product receiver 40 to drop the product W2 held by the first spindle 13 into the product discharge chute 30.

FIG. 3 schematically shows positional relationship of the product discharge chute 30 and the product receiver 40 as seen from the A2 direction in FIG. 2. The chute 30 as shown in FIG. 1 to FIG. 3 may have a chute body 31 opened upward and a chute ceiling 33 covering part of the chute body 31. As shown in FIG. 2, the chute body 31 may have the opening 32 facing upward. The chute body 31 may have a bottom surface 31*a* sloping down from the machining chamber C1 to the outside O1. The chute driver 38 as shown in FIG. 1 may move the chute body 31 in the Y-axis direction in response to a command from the NC apparatus 70. The chute driver 38 can adjust a height gap between the chute opening 32 and the product receiver 40 held by the second spindle 14 that does not move in the Y-axis direction. The chute ceiling 33 may not elevate. The ceiling 33 may cover part of the opening 32 within a range excluding an area close to the guide bush 21. The chute ceiling 33 may have an upper surface 34 sloping down toward an inward direction DI from the guide bush 21 toward the headstock 12 along the Z-axis direction. The workpiece chip dropped on the upper surface 34 of the chute 30 can be easily dropped onto the floor of the machining chamber C1.

The product W2 dropped through the uncovered part of the opening 32 of the chute 30 may be carried along the bottom surface 31*a* to be discharged from the machining chamber C1 to the outside O1. The product W2 discharged to the outside O1 may be conveyed by a not-shown conveyer.

There is a possibility that a chip of the workpiece W1 enters the uncovered part of the chute opening 32 facing upward in the machining chamber C1. In this embodiment, after dropping the product W2 into the chute 30, the product receiver 40 may be kept on standby in a product dropping position P2 to close the chute opening 32.

Figure 4:
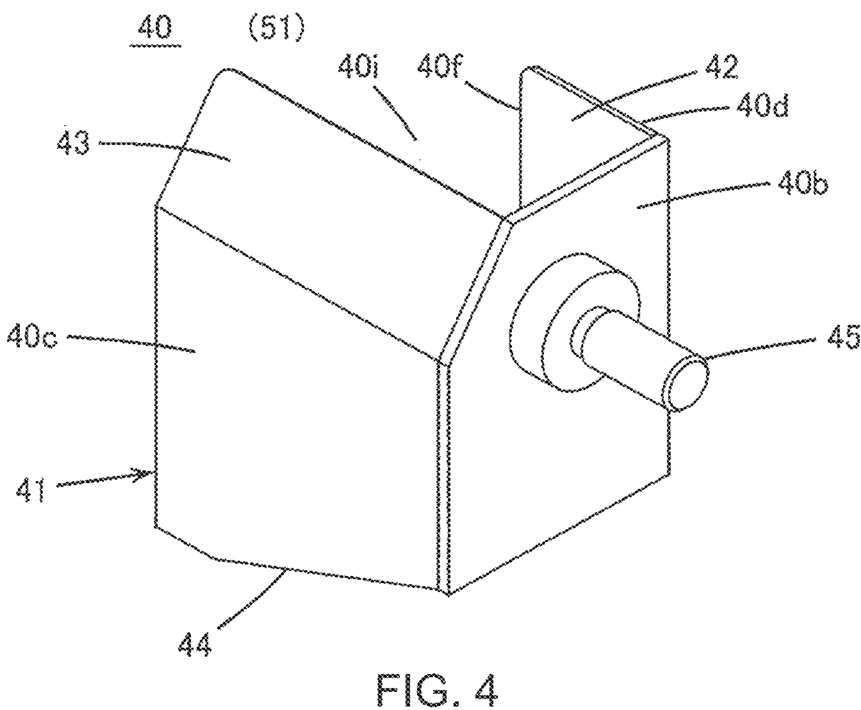
FIG. 4 schematically shows an appearance of the product receiver as seen from a base end surface thereof.
Figure 5:
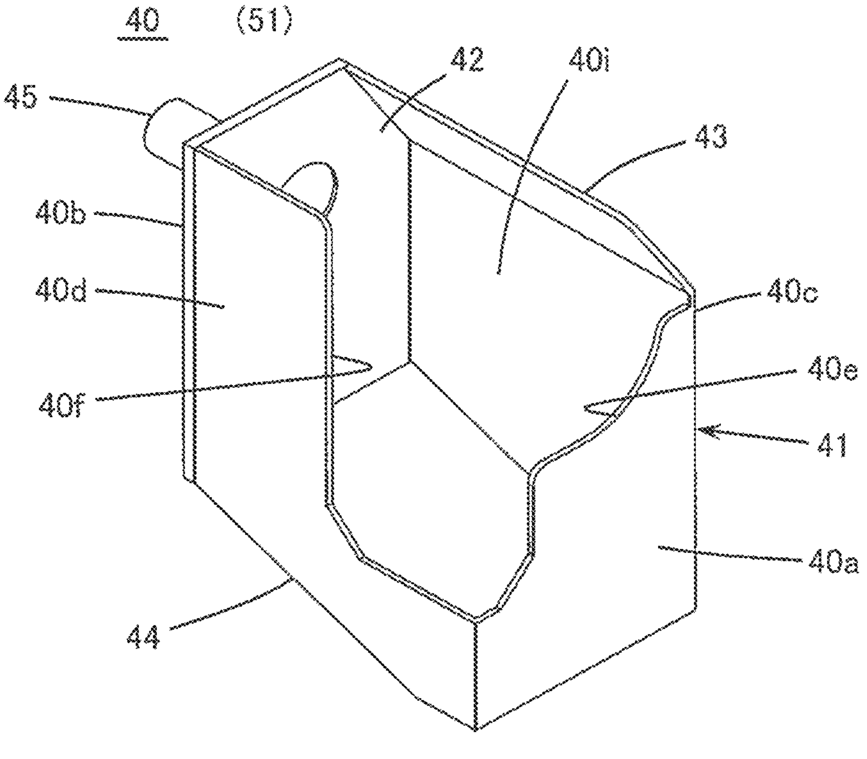
FIG. 5 schematically shows an appearance of the product receiver as seen from a distal end surface thereof.

FIG. 4 schematically shows an appearance of the product receiver 40 as seen from a base end surface 40*b*. FIG. 5 schematically shows an appearance of the product receiver 40 as seen from a distal end surface 40*a*. The product receiver 40 may assume a mounting posture 51, which is an upright posture when the receiver 40 is mounted on the second spindle 14.

Figure 8:
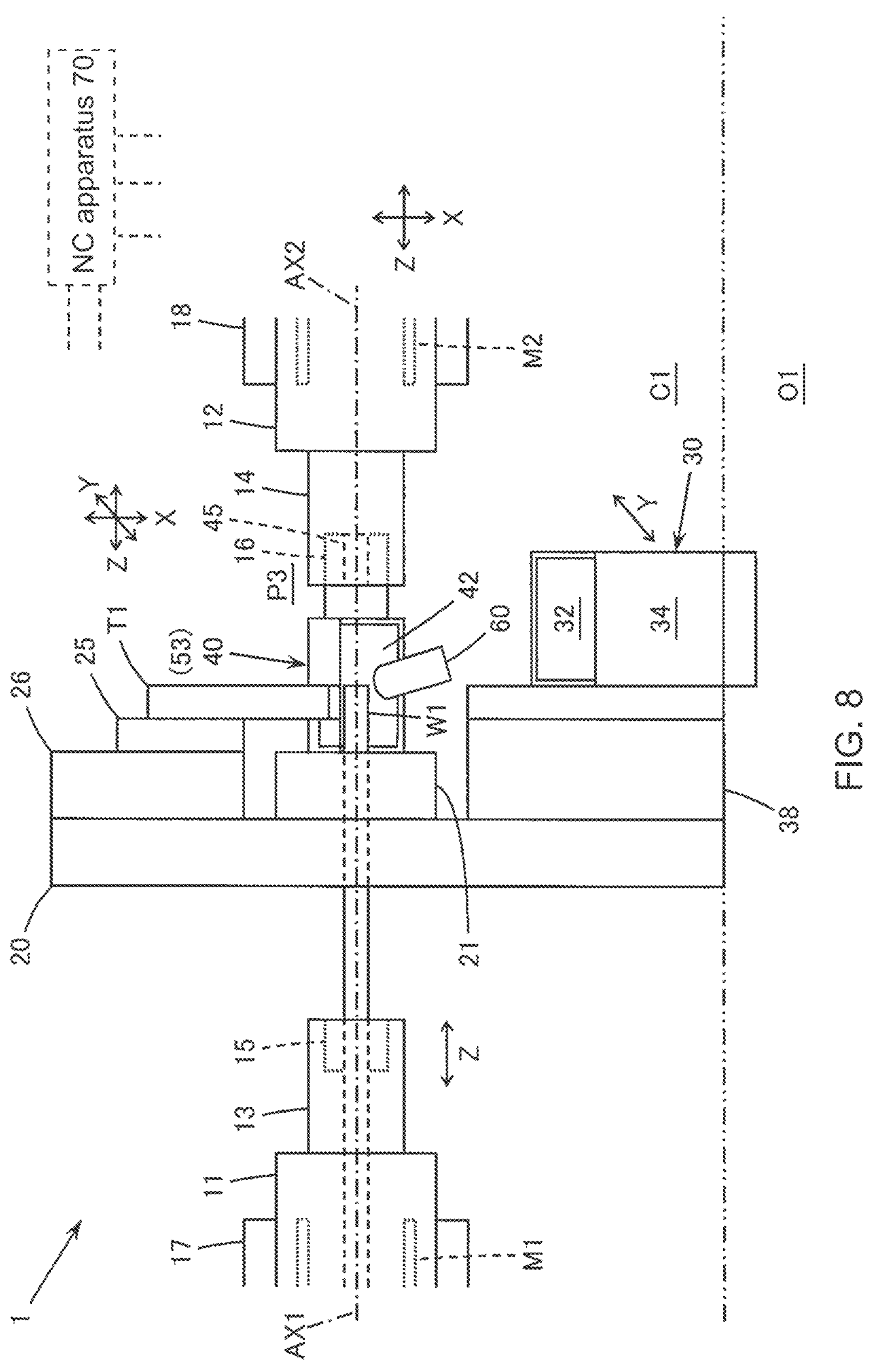
FIG. 8 is a plan view schematically showing the machine tool whose product receiver in a product receiving posture is located in a product receiving position.

The product receiver 40 as shown in FIG. 1 to FIG. 5 may have a receiver body 41 and a shaft 45. The receiver body 41 may have an inside 40*i* to accommodate the product W2. The shaft 45 may be held by the chuck 16 of the second spindle 14. The receiver body 41 may have the distal end surface 40*a* opposite the shaft 45, the base end surface 40*b* from which the shaft 45 protrudes, a bent side surface 40*c* connecting the base end surface 40*b* and the distal end surface 40*a*, a cutout side surface 40*d* opposite the bent side surface 40*c*, and an inclined surface 44 constituting a bottom when the receiver 40 assumes the mounting posture 51. The inside 40*i* of the receiver body 41 may be surrounded by the distal end surface 40*a*, the base end surface 40*b*, the bent side surface 40*c*, and the cutout side surface 40*d*. The inside 40*i* may be opened upward and closed by the inclined surface 44 when the receiver 40 assumes the mounting posture 51. The receiver body 41 may be provided with an opening 42 to accommodate the product W2 in the inside 40*i* when the receiver 40 assumes the mounting posture 51. The mounting posture 51 may be one of the postures of the receiver 40 capable of accommodating the product W2 in the inside 40*i*. The receiver opening 42 opposite the bottom may face upward when the receiver 40 assumes the mounting posture 51. The distal end surface 40*a* may have a cutout 40*e* for passing the workpiece W1 through in the Z-axis direction when the receiver 40 is located in the product receiving position P3 as shown in FIG. 2 and FIG. 8. The bent side surface 40*c* may have an angled part 43 to narrow the opening 42. An interval between the bent side surface 40*c* and the cutout side surface 40*d* may be narrower at the angled part 43. The cutout side surface 40*d* may have a cutout 40*f* for passing the cut-off tool T1 through in the X-axis direction when the receiver 40 is located in the product receiving position P3 as shown in FIG. 2 and FIG. 8. The cutout 40*f* of the cutout side surface 40*d* may be connected to the cutout 40*e* of the distal end surface 40*a*.

The product receiver 40 may assume a product dropping posture 52 in the product dropping position P2 in FIGS. 2 and 3 by rotating the receiver 40 in the mounting posture 51 as shown in FIGS. 4 and 5 on the spindle axis AX2 by 180 degrees. The product W2 accumulated in the inside 40*i* of the receiver 40 in the product dropping posture 52 may be dropped through the receiver opening 42. The receiver opening 42 opposite the bottom may face downward when the receiver 40 assumes the product dropping posture 52. In the product dropping position P2, the product receiver 40 may be kept on standby during which the chute opening 32 is closed by the receiver 40 kept in the product dropping posture 52. In the product dropping position P2, the second spindle 14 may be located closer to the first spindle 13 than to an origin position P1 with respect to the Z-axis direction. As shown in FIG. 2, the uncovered part of the chute opening 32 may be narrow with respect to the X-axis direction compared with the product receiver 40 kept in the product dropping posture 52. The receiver opening 42 may be reduced in width by the angled part 43. The product receiver 40 may be then sure to drop the product W2 through the chute opening 32. The product receiver 40 may be wide compared with the uncovered part of the chute opening 32, which enhances the effect of preventing entry of the workpiece chip into the product discharge chute 30. Especially, the effect is further enhanced in a case that a clearance CL1 exists with respect to the Y-axis direction between the chute body 31 and the product receiver 40.

The inclined surface 44 of the product receiver 40 kept in the product dropping posture 52 may be extended along the upper surface 34 of the product discharge chute 30. The inclined surface 44 may therefore slope down toward the inward direction DI from the guide bush 21 toward the headstock 12 along the Z-axis direction. Any chip adhered to the inclined surface 44 can easily drop onto the floor of the machining chamber C1.

In the product receiving position P3 as shown in FIGS. 2 and 8, the product receiver 40 may assume a product receiving posture 53 by rotating the product receiver 40 in the mounting posture 51 as shown in FIGS. 4 and 5 on the spindle axis AX2 by 30 degrees. In the product receiving position P3, part of the workpiece W1 to be discharged as the product W2 may drop into the inside 40*i* of the receiver 40. In the product receiving position P3, the second spindle 14 may be located closer to the first spindle 13 than to the origin position P1 with respect to the Z-axis direction. The receiver opening 42 of the receiver 40 may be reduced in width by the angled part 43 to ensure a drop of the product W2 into the inside 40*i* of the receiver 40 when the product W2 is separated from the longitudinal workpiece W1 with the cut-off tool T1. If the product receiver 40 still assumes the upright mounting posture 51, the angled part 43 would interrupt coolant pouring from the coolant discharger 60. The NC apparatus 70 may control rotation of the product receiver 40 on the spindle axis AX2 to assure coolant pouring on the workpiece W1 protruded from the guide bush 21. The rotation angle (O) of the product receiver 40 in the product receiving posture 53 may not be limited to 30 degrees. The angle may be varied in a range of more than 1 degree to 60 degrees or less or desirably to 45 degrees or less according to positional relationship of the workpiece W1 and the coolant discharger 60. The product receiver 40 in the product receiving posture 53 can keep the product W2 in the inside 40*i*. The receiver opening 42 opposite the bottom may face diagonally upwards.

Figure 6:
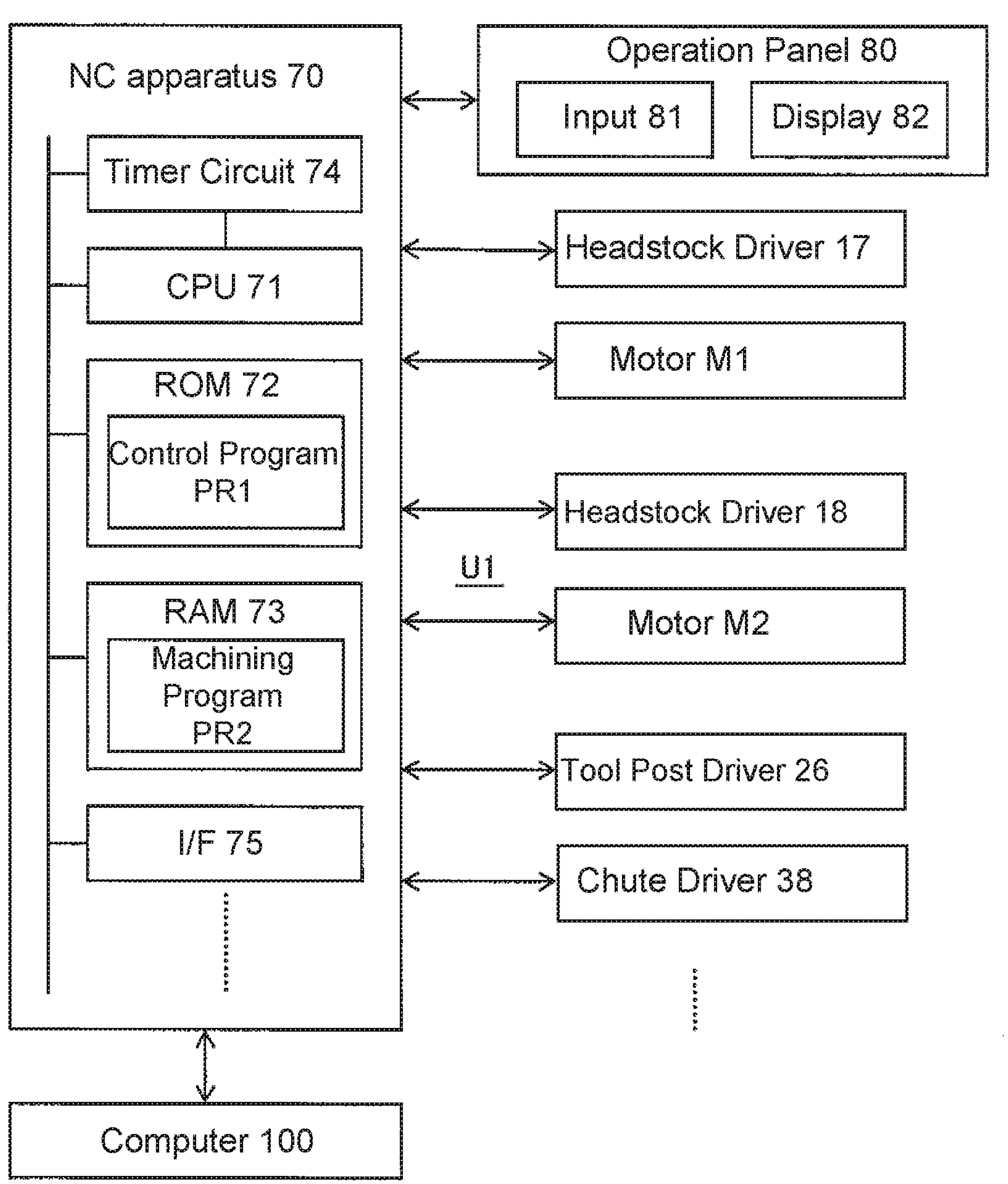
FIG. 6 is a block diagram schematically showing a configuration of an electric circuit of the machine tool.

FIG. 6 schematically shows a configuration of an electric circuit in the machine lathe 1. The NC apparatus 70 may be connected to an operation panel 80, the headstock drivers 17 and 18, the motors M1 and M2, the tool post driver 26, the chute driver 38, and an external computer 100. The NC apparatus 70, the headstock driver 18, and the motor M2 may be an example of the controller U1.

The NC apparatus 70 may include a processor called a CPU (Central processing Unit) 71, a semiconductor memory called a ROM (Read Only Memory) 72, a semiconductor memory called a RAM (Random Access Memory) 73, a timer circuit 74, and an I/F (Interface) 75. The NC apparatus 70 may be a kind of computer. In FIG. 6, the I/F 75 may include interfaces for the headstock drivers 17 and 18, the motors M1 and M2, the tool post driver 26, the chute driver 38, and the computer 100. The ROM 72 may store a control program PR1 for interpreting and executing a machining program PR2. The machining program PR2 may include a product receiver control program that controls movement and rotation of the second spindle 14 holding the product receiver 40. The ROM 72 may be a rewritable semiconductor memory. The RAM 73 may rewritably store the machining program PR2 prepared by an operator. The machining program PR2 may be also called an NC program. The CPU 71 may use the RAM 73 as a work area to execute the control program PR1 stored in the ROM 72. The CPU 17 may thereby control operation of the headstock drivers 17 and 18, the motors M1 and M2, the tool post driver 26, and the chute driver 38. Part or whole of the functions performed by the control program PR1 may be executed by other means such as an ASIC (Application Specific Integrated Circuit).

The operation panel 80 may include an input 81 and a display 82 functioning as a user interface with the NC apparatus 70. The input 81 may include a button and a touch panel receiving a setting input by the operator. The display 82 may show the operator settings and various information about the machine tool 1. The operator can store the machining program PR2 in the RAM 73 by using the operation panel 80 and the computer 100.

The external computer 100 may be wireless or wired connected to the NC apparatus 70 for data communication. The connection may be a network such as an internet and an intranet. The computer 100 may include a personal computer including a tablet terminal and a mobile phone including a smartphone.

(3) Effect of the Embodiment

The product W2 made of the workpiece W1 held by the first spindle 13 may be received by the product receiver 40 and dropped to the product discharge chute 30 in the machine tool 1 of the embodiment. The operation of the embodiment is being described. The operator may attach the product receiver 40 kept in the upright mounting posture 51 to the second spindle 14 in the origin position P1 in FIG. 1. The shaft 45 of the product receiver 40 may be held by the chuck 16 of the second spindle 14 in the origin position P1.

The machining program PR2 may include a description of a command as follows:

(Command A) Move the second spindle 14 holding the product receiver 40 in the mounting posture from the origin position P1 to the product dropping position P2. Rotate the second spindle 14 by 180 degrees during the movement to change the product receiver 40 into the product dropping posture 52 to thereby close the chute opening 32.

(Command B) Move the second spindle 14 holding the product receiver 14 closing the chute opening 32 to the product receiving position P3 through the origin position P1. Rotate the second spindle 14 to a rotation position of 0-30 degrees during the movement to change the product receiver 40 into the product receiving posture 53. Move the second spindle 14 from the product receiving position P3 to the product dropping position 52 through the origin position P1. Rotate the second spindle 14 to a rotation position of 180 degrees to change the product receiver 40 into the product dropping posture 52 immediately before reaching the product dropping position P2 to thereby close the chute opening 32 by the receiver 40.

(Command C) Move the second spindle 14 holding the product receiver 40 closing the chute opening 32 to the origin position P1. Rotate the second spindle by 180 degrees during the movement to change the product receiver 40 into the mounting posture 51.

The product receiver 40 kept in one of the mounting posture 51 and the product receiving posture 53 would interfere the chute body 31 when the receiver 40 reaches the product dropping position P2. It is therefore necessary that the product receiver 40 may start rotation before reaching the product dropping position P2. Specifically, in the command A, the product receiver 40 may start to change from the mounting posture 51 to the product dropping posture 52 during the time the second spindle 14 moves from the origin position P1 to a position immediately before the product dropping position P2. In the command B, the product receiver 40 may drop the product W2 into the product discharge chute 30. It is therefore necessary that the product receiver 40 may start to change from the mounting posture 51 to the product dropping posture 52 immediately before the second spindle 14 reaches the product dropping position P2. Further in the command B, the product receiver 40 may start to change from the product dropping posture 52 to the product receiving posture 53 during the time the second spindle 14 moves from the product dropping position P2 to a position immediately before the product receiving position P3. In the command B, the second spindle 14 may pass the origin position P1 between the product dropping position P2 and the product receiving position P3 to avoid interference of the product receiver 40 and the second spindle 14 with other structures such as the tool post.

The machining program PR2 may include the command A before a start of a continuous machining of the workpiece W1, the command B at each time the product W2 is separated from the longitudinal workpiece W1 with the cut-off tool T1, and the command C after completion of the continuous machining of the workpiece W1.

The NC apparatus 70 may interpret and execute the machining program PR2 in accordance with the control program PR1. In executing the command A, the NC apparatus 70 may control the headstock driver 18 to move the second spindle 14 having the product receiver 40 kept in the mounting posture 51 from the origin position P1 to the product dropping position P2. The NC apparatus 70 may control the motor M2 to rotate the second spindle 14 by 180 degrees before reaching the product dropping position P2. Upon receiving the command, the headstock driver 18 may start movement of the second spindle 14 from the origin position P1 to the product dropping position P2 and the motor M2 may rotate the second spindle 14 by 180 degrees. Upon completion of the movement of the second spindle 14 by the headstock driver 18, the second spindle 14 having the product receiver 40 in the product dropping posture 52 may be located in the product dropping position P2 as shown in FIG. 7. It may be then found that the chute opening 32 of the product discharge chute 30 is closed by the product receiver 40 kept in the product dropping posture 52 as shown by a two-dot line in the product dropping position P2 in FIGS. 2 and 3.

In executing the command B, the NC apparatus 70 may control the headstock driver 18 to move the second spindle 14 having the product receiver 40 kept in the product dropping posture 52 from the product dropping position P2 to the product receiving position P3 through the origin position P1. The NC apparatus 70 may control the motor M2 to rotate the second spindle 14 to a rotation position of 0-30 degrees during the time from the start from the product dropping position P2 to the arrival at a position immediately before the product receiving position P3. Upon receiving the command, the headstock driver 18 may start movement of the second spindle 14 from the product dropping position P2 to the product receiving position P3 through the origin position P1 and the motor M2 may rotate the second spindle 14 to a rotation position of 0-30 degrees during the time from the start from the product dropping position P2 to the arrival at a position immediately before the product receiving position P3. Upon completion of the movement of the second spindle 14 by the headstock driver 18, the second spindle 14 having the product receiver 40 in the product receiving posture 53 may be located in the product receiving position P3 as shown in FIG. 8. It may be then found that a front end of the workpiece W1 and an edge of the cut-off tool T1 is located in the inside 40*i* of the receiver 40 as shown by a two-dot line in the product receiving position P3 in FIG. 3. The product receiver 40 can receive the product W2 separated from the workpiece W1 with the cut-off tool T1. As described above, the NC apparatus 70 may control movement and rotation of the second spindle 14 to allow the product receiver 40 to receive the product W2, which has been made of the workpiece W1 held by the first spindle 13, in the product receiving position P3.

Then, the NC apparatus 70 may control the headstock driver 18 to move the second spindle 14 having the product receiver 40 in the product receiving posture 53 from the product receiving position P3 to the product dropping position P2 through the origin position P1. The NC apparatus 70 may control the motor M2 to start to rotate the second spindle 14 to a rotation position of 180 degrees immediately before the arrival at the product dropping position P2. Upon receiving the command, the headstock driver 18 may start movement of the second spindle 14 from the product receiving position P3 to the product dropping position P2 through the origin position P1. The motor M2 may start to rotate the second spindle 14 to a rotation position of 180 degrees immediately before the arrival at the product dropping position P2. Then, the product receiver 40 may drop the product W2 into the product discharge chute 30 through the chute opening 32. Upon completion of the movement of the second spindle 14 by the headstock driver 18, the second spindle 14 having the product receiver 40 kept in the product dropping posture 52 may be located in the product dropping position P2 as shown in FIG. 7. It may be then found that the chute opening 32 is closed by the product receiver 40 kept in the product dropping posture 52 as shown by a two-dot line in the product dropping position P2 in FIGS. 2 and 3. As described above, the NC apparatus 70 may control movement from the product receiving position P3 to the product dropping position P2 and rotation of the second spindle 14 to allow the product receiver 40 to drop the product W2 into the product discharge chute 30 and then to keep the product dropping posture 52 in a standby state closing the chute opening 32.

Another machining on the workpiece W1 held by the first spindle 13 may be performed with the tool TO. The NC apparatus 70 may execute another command B before the product W2 is separated from the workpiece W1 with the cut-off tool T1. The NC apparatus 70 may send another command B to the headstock driver 18 to move the second spindle 14 having the product receiver 40 kept in the product dropping posture 52 from the product dropping position P2 to the product receiving position P3 through the origin position P1. The NC apparatus 70 may control the motor M2 to rotate the second spindle 14 to a rotation position of Θ=30 degrees during the time from the start from the product dropping position P2 to the arrival at a position immediately before the product receiving position P3. It may be then found that the second spindle 14 having the product receiver 40 in the product receiving posture 53 is located in the product receiving position P3 as shown in FIG. 8. As described above, the NC apparatus 70 may control movement and rotation of the second spindle 14 to allow the product receiver 40 to return to the product receiving position P3 to receive another product W2 after the standby state closing the chute opening 32.

In a latter half of the command B, the NC apparatus 70 may cooperate with the headstock driver 18 to move the second spindle 14 having the product receiver 40 in the product receiving posture 53 from the product receiving position P3 to the product dropping position P2 through the origin position P1. The NC apparatus 70 may cooperate with the motor M2 to start to rotate the second spindle 14 to a rotation position of 180 degrees immediately before the arrival at the product dropping position P2. Then, the product receiver 40 may drop the product W2 into the product discharge chute 30 through the chute opening 32. The second spindle 14 having the product receiver 40 in the product dropping posture 52 may be located in the product dropping position P2 as shown in FIG. 7.

Upon completion of the continuous machining on the workpiece W1, the NC apparatus 70 may execute the final command C. The NC apparatus 70 may control the headstock driver 18 to move the second spindle 14 having the product receiver 40 kept in the product dropping posture 52 from the product dropping position P2 to the origin position P1. The NC apparatus 70 may control the motor M2 to rotate the second spindle 14 to a rotation position of 0 degree after the product receiver 40 starts from the product dropping position P2. The headstock driver 18 may move the second spindle 14 from the product dropping position P2 to the origin position P1. The motor may rotate the second spindle 14 to a rotation position of 0 degree after the product receiver 40 starts from the product dropping position P2. Upon completion of movement of the second spindle 14, it may be found that the second spindle 14 holding the product receiver 40 kept in the mounting posture 51 is located in the origin position P1 as shown in FIG. 1.

As described above, the product receiver 40 may move and rotate to drop the product W into the product discharge chute 30 through the chute opening 32 in the product dropping position P2 and then to keep on standby to close the chute opening 32. The product receiver 40 may then return to the product receiving position P3 to receive another product W2. The product receiver 40 closing the chute opening 32 prevents entry of the chip of the workpiece W1 into the product discharge chute 30. The embodiment provides a machine tool capable of reducing entry of the workpiece chip into the chute 30 and facilitating a chip removing work. The product receiver 40 may be kept in the product dropping posture 52 capable of closing the chute opening 32. It may be therefore unnecessary to further rotate the product receiver 40 to close the chute opening 32. The embodiment improves efficiency of the manufacturing cycle from the workpiece machining to the product discharge.

(4) Modified Embodiments

The invention may be embodied in various modifications. The second spindle 14 may or may not move through the origin position P if there is no interference on the way of the second spindle 14 having the product receiver 40.

The upper surface 34 of the chute 30 and the inclined surface 44 of the product receiver 40 may slope down toward the inward direction DI in FIG. 3. Instead, they may slope down from the chute 30 to the guide bush 21 along the X-axis direction.

There may exist a clearance (the clearance CL1 as shown in FIG. 2) between the product discharge chute 30 and the product receiver 40 located in the product dropping position P2. A cushion filling the clearance may be provided on at least one of the chute 30 and the receiver 40. The chute body 31 may be raised to reduce the clearance CL with respect to the Y-axis direction by the chute driver 38 under control of the NC apparatus 70 during the time the product receiver 40 is kept on standby in the product dropping position P2. The product discharge chute 30 may be lowered to the original revel by the chute driver 38 under control of the NC apparatus if the chute opening 32 is not closed by the product receiver 40.

Figure 9:
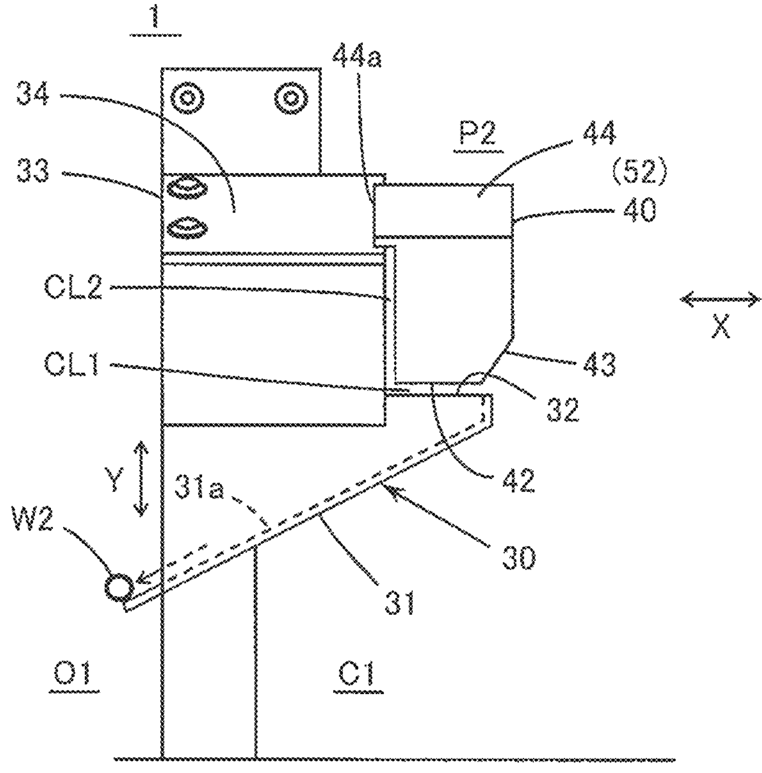
FIG. 9 schematically shows the machine tool whose product receiver has an inclined surface having an eaves.

As shown in FIG. 9, the inclined surface 44 of the product receiver 40 may have an eaves 44*a* extending to the upper surface 34 of the chute 30 to cover part thereof to thereby close a clearance CL2 with respect to the X-axis direction. The angle of the upper surface 34 and the inclined surface 44 may be preferably the same. Instead, the upper surface 34 of the chute 30 may have a not-shown eaves extending to the inclined surface 44 of the product receiver 40 to cover part thereof. Instead, a cushion may be provided to the receiver 40, the chute opening 32, and others to fill the clearance CL1 or the clearance CL2.

The product receiver 40 may be kept in the product dropping posture 52 in the standby state closing the chute opening 32. Instead, the product receiver 40 may be in a different posture in the standby state. For example, the NC apparatus 70 may cooperate with the motor M2 to rotate the second spindle 14 to a rotation position of 90 degrees to thereby bring the product receiver 40 in a sideways posture to thereby close the chute opening 32.

The machine tool 1 may not include the chute driver 38. Such machine tool is still capable of reducing entry of the workpiece chip into the product discharge chute.

(5) Conclusion

The invention provides a technology capable of reducing entry of the workpiece chip into the product discharge chute in various embodiments. A fundamental effect as above described is also available from any technology only consisting of the elements of the independent claim. The invention covers any mutually replaced or modified configuration in the embodiments or prior art.

What is claimed is:

1. A machine tool comprising:

a rotatable first spindle holding a workpiece;

a tool post retaining a tool for machining the workpiece;

a rotatable and movable second spindle holding a product receiver that receives a product made from the workpiece;

a product discharge chute provided with an opening facing upward with a first part thereof covered by a ceiling and a second part thereof completely uncovered; and a controller controlling movement and rotation of the second spindle, wherein the first spindle is rotatable about a first spindle axis defining a first horizontal direction, wherein, in a product dropping posture, a maximum width of the product receiver is wider than the uncovered second part of the opening in a second horizontal direction perpendicular to the first horizontal direction, wherein a maximum width of the product discharge chute is wider than the ceiling in the second horizontal direction, wherein upward is a direction perpendicular to both of the first horizontal direction and the second horizontal direction, wherein the controller is configured to control a receipt of the product made from the workpiece held by the first spindle by the product receiver in a product receiving position and movement of the product receiver to a product dropping position and rotation of the product receiver to bring the product receiver into the product dropping posture to drop the product to the product discharge chute through the opening, and wherein the controller is configured to control the second spindle to keep the second spindle in the product dropping position in a state which the opening of the product discharge chute is closed by the product receiver kept in the product dropping posture during another machining on the workpiece held by the first spindle being performed after the product is dropped to the product discharge chute through the opening, and then moves the product receiver to the product receiving position to receive another product made of the workpiece held by the first spindle.

2. A machine tool control method comprising providing the machine tool of claim 1;

receiving the product made of the workpiece held by the first spindle by the product receiver in the product receiving position;

moving the product receiver to the product dropping position;

rotating the product receiver to bring the product receiver into the product dropping posture;

dropping the product to the product discharge chute through the opening;

then keeping the second spindle in the product dropping position in the state which the opening of the product discharge chute is closed by the product receiver kept in the product dropping posture during another machining on the workpiece held by the first spindle during another machining on the workpiece held by the first spindle; and then moving the product receiver to the product receiving position to receive another product made of the workpiece held by the first spindle.

* * * * *